United States Patent
Pogue et al.

(10) Patent No.: US 9,799,329 B1
(45) Date of Patent: Oct. 24, 2017

(54) REMOVING RECURRING ENVIRONMENTAL SOUNDS

(71) Applicant: Amazon Technologies, Inc., Seattle, WA (US)

(72) Inventors: Michael Alan Pogue, Sunnyvale, CA (US); Kurt Wesley Piersol, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 14/559,687

(22) Filed: Dec. 3, 2014

(51) Int. Cl.
| | | |
|---|---|---|
| *G10L 15/00* | (2013.01) | |
| *G10L 15/20* | (2006.01) | |
| *G10L 17/22* | (2013.01) | |
| *G10L 25/78* | (2013.01) | |
| *G10L 15/06* | (2013.01) | |
| *G10L 15/065* | (2013.01) | |

(52) U.S. Cl.
CPC .............. *G10L 15/20* (2013.01); *G10L 17/22* (2013.01); *G10L 15/063* (2013.01); *G10L 15/065* (2013.01); *G10L 25/78* (2013.01)

(58) Field of Classification Search
CPC ....... G10L 15/22; G10L 15/30; G10L 15/265; G10L 15/20; G10L 15/02; G10L 15/063; G10L 15/065; G10L 19/02; G10L 25/78; H05L 999/99
USPC ....... 704/221, 231, 233, 243, 244, 251, 268, 704/270, 275
See application file for complete search history.

*Primary Examiner* — Vu B Hang
(74) *Attorney, Agent, or Firm* — Lee & Hayes, PLLC

(57) ABSTRACT

This disclosure describes, in part, techniques and devices for identifying recurring environmental sounds in an environment such that these sounds may be canceled out of corresponding audio signals to increase signal-to-noise ratios (SNRs) of the signals and, hence, improve automatic speech recognition (ASR) on the signals. Recurring environmental sounds may include the ringing of a mobile phone, the beeping sound of a microphone, the buzzing of a washing machine, or the like.

20 Claims, 6 Drawing Sheets

REMOVING RECURRING ENVIRONMENTAL SOUNDS

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
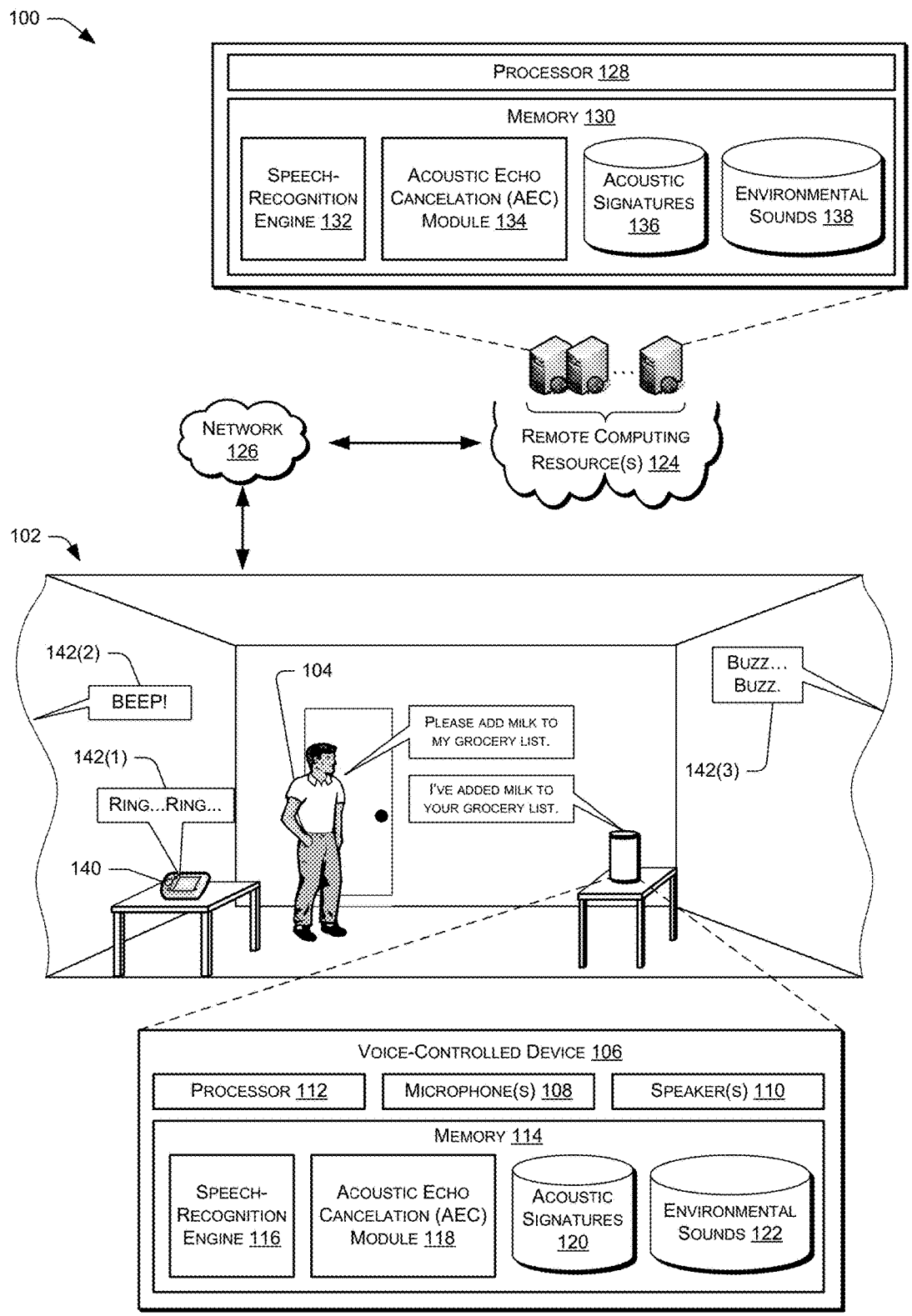
FIG. 1 shows an illustrative voice interaction computing architecture set in a home environment. The architecture includes a voice-controlled device physically situated in the home and communicatively coupled to remote computing resources. The voice-controlled device includes a microphone to receive voice commands, speakers for outputting audio to the user, and an acoustic echo cancelation (AEC) module to remove portions of audio signals corresponding to environmental sounds for the purpose of improving automatic speech recognition (ASR) performed on the audio signals generated by the device.

This disclosure describes, in part, techniques and devices for identifying recurring environmental sounds in an environment such that these sounds may be canceled out of corresponding audio signals to increase signal-to-noise ratios (SNRs) of the signals and, hence, improve automatic speech recognition (ASR) performed on the signals.

As described below, a voice-controlled device may include one or more microphones for capturing sound from an environment, with this sound including both voice commands from a user as well as environmental sounds. The environmental sounds may include noise from other electronic devices (e.g., a television, radio, or mobile phone), street noise, the beep of a microwave, the buzz of a dishwasher, washing machine, or dryer, or the like. In some instances, the voice-controlled device may generate an audio signal that represents an environmental sound and may create a corresponding signature based on amplitude and frequency of the signal with respect to time. In addition, time-difference-of-arrival (TDOA) and/or beamforming techniques may be utilized to determine a direction from within the environment from which the sound originated. This direction may also be utilized when creating the signature.

In some instances, the voice-controlled device that generated the audio signal may create the signature of the sound, while in other instances remote resources may do so. In either instance, after the signature is created, it may be stored on the device, remotely, or at multiple locations. By maintaining the signature of the environmental sound, the device or the remote resources may continue to monitor audio signals generated by the device to identify substantially similar signatures to determine another occurrence of the same sound. Each time the device "hears" the sound having the substantially similar signature, the device (or the remote resources) may increment a count of a number of times that the sound has been heard. Upon this count reaching a threshold count, then the sound may be classified as an environmental sound that is to be removed from future audio signals generated by the device.

After the sound has been classified as an environmental sound that is to be removed from an audio signal prior to performing ASR on the audio signal, then when the signature corresponding to the sound is identified in a subsequent audio signal, the portion of the audio signal corresponding to the sound may be removed. In some instances, one or more of multiple different methods may be utilized to remove the portion of the audio signal corresponding to the environmental sound. For instance, a filter (e.g., a parametric filter) may be inserted to remove one or more frequency ranges of the audio signal. Any parameters may be used in the parametric filter. In one example, a notch filter may be inserted, with the notch filter configured to remove, from the audio signal, portion(s) of the signal corresponding to a frequency range approximately equal to the frequency of the sound. In another instance, the identified waveform of the audio signal corresponding to the sound may be subtracted from the newly generated audio signal. In either case, a modified audio signal is generated, on which the voice-controlled device or the remote resources may perform ASR.

In some instances, characteristics associated with the sound to be removed may be referenced when determining which method to implement to remove the portion of the audio signal corresponding to the sound. These characteristics may include a frequency, amplitude or direction of the sound. To provide an example, if the sound comprises a relatively high or low frequency sound (relative to the frequency of user voice commands), then a parametric filter (e.g., a notch filter) corresponding to this frequency range may be utilized. Furthermore, in addition to removing this portion of the audio signal, information associated with the removed portion of the signal may be provided to an ASR engine to aid in the ASR. For instance, the ASR engine may receive an indication of the frequency of the removed sound and may accordingly weight any remaining portion of the audio signal at or near this frequency band lower when performing the ASR. That is, the ASR engine may "listen" more intently to frequency bands outside of the frequency band corresponding to the filtered environmental sound.

In some instances, the sound may be classified as an environmental sound in response to the sound being identified without a voice command following the sound within a threshold amount of time. That is, if an audio signal is generated that indicates the sound, and yet no voice command follows the sound, then the signature corresponding to the sound may be stored for determining whether the sound is a recurring sound that should be removed.

To provide an example, envision that the voice-controlled device resides within a kitchen. Periodically, the device may generate an audio signal that indicates the presence of the beep of a microwave. Each time a beep of the microwave is heard, the device may increment a count of the number of times this sound has been heard. Upon the device hearing the microwave beep a threshold number of times (either in total or over a sliding window amount of time) without a voice command following the beep, the device or the remote resources may classify the microwave beep as an environmental sound that is to be filtered out of subsequent audio signals that indicate the presence of the microwave beep. Of course, these techniques may be helpful to filter out other environmental sounds, such as the buzz from an oven, washing machine, or other appliance, street noise, the ring of a cell phone, the ring of a doorbell, the squeak of a door, or the like.

Furthermore, in some instances the voice-controlled device may only generate a signal containing the environmental sound in response to determining a user within the environment has uttered a predefined keyword (thus authorizing the device to begin capturing audio that occurs within the environment). For instance, the voice-controlled device may be configured to listen for the predefined keyword and, only upon identifying this keyword, may the device begin to generate audio signals for performing automatic speech recognition thereon. Therefore, in the examples above a user may utter the predefined keyword, the device may generate an audio signal that includes an environmental sound (e.g., a microwave beep). The device (or a remote entity) may then identify the environmental sound and classify it as such.

The devices and techniques introduced above may be implemented in a variety of different architectures and contexts. One non-limiting and illustrative implementation is described below.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has a microphone unit comprising at least one microphone 108 and a speaker unit comprising at least one speaker 110 to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 5.

The microphone 108 of the voice-controlled device 106 detects audio from the environment 102, such as sounds uttered from the user 104 as well as sounds emitted from other entities within the environment 102. As illustrated, the voice-controlled device 106 includes a processor 112 and memory 114, which stores or otherwise has access to a speech-recognition engine 116, an acoustic echo cancelation (AEC) module 118, a datastore of one or more acoustic signatures 120 corresponding to previously captured sounds, and a datastore of one or more indications 122 of captured sounds designated as environmental sounds to be removed from subsequently generated audio signals.

The speech-recognition engine 116 performs speech recognition on audio signals generated based on sound captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema."). In some instances, the local speech-recognition engine 116 on the device 106 may identify a predefined keyword(s) and, after identifying the keyword(s) may begin generating audio signals to identify voice commands from the user, either locally or via a remote speech-recognition engine (described below). The AEC module 118, meanwhile, may perform acoustic echo cancelation on generated audio signals to increase SNRs of the audio signals, as discussed in further detail below.

In some instances, the voice-controlled device 106 may operate in conjunction with or may otherwise utilize computing resources 124 that are remote from the environment 102. For instance, the voice-controlled device 106 may couple to the remote computing resources 124 over a network 126. As illustrated, the remote computing resources 124 may be implemented as one or more servers and may, in some instances, form a portion of a network-accessible computing platform implemented as a computing infrastructure of processors, storage, software, data access, and so forth that is maintained and accessible via a network such as the Internet. The remote computing resources do not require end-user knowledge of the physical location and configuration of the system that delivers the services. Common expressions associated with these remote computing resources include "on-demand computing", "software as a service (SaaS)", "platform computing", "network-accessible platform", "cloud services", "data centers", and so forth.

The servers may include a processor 128 and memory 130. As illustrated, the memory 130 may also store and utilize a speech-recognition engine 132, an AEC module 134, one or more acoustic signatures 136, and one or more indications of environmental sounds 138 (all of which may be the same or different as their counterparts stored on the device 106). The speech-recognition engine 132 may receive audio signals from the device 106, recognize speech and, potentially, cause performance of an action in response. For instance, the engine 132 may identify speech within an audio signal by performing natural language understanding (NLU) techniques on the audio signal. In addition, the engine 132 may provide audio for output on a client device (e.g., the device 106) via text-to-speech (TTS). In some examples, the voice-controlled device 106 may upload audio data to the remote computing resources 124 for processing, given that the resources 124 may have a computational capacity that far exceeds the computational capacity of the voice-controlled device 106. Therefore, the voice-controlled device 106 may utilize the speech-recognition engine 132 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 124 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In the illustrated example, for instance, the user 104 asks that the device 106 add milk to a grocery list of the user. In response to receiving and identifying this request, the device 106 adds the item to the list and outputs an indication, via the speaker 110, that it has done so. In some instances, the device 106 also interacts with a client application accessible by one or more client devices of the user 104.

The voice-controlled device 106 may communicatively couple to the network 126 via wired technologies (e.g., wires, USB, fiber optic cable, etc.), wireless technologies (e.g., WiFi, RF, cellular, satellite, Bluetooth, etc.), or other connection technologies. The network 126 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

In addition to the voice command from the user 104, FIG. 1 illustrates that additional sounds may be output in the environment. For instance, a phone 140 of the user 104 is shown to output a sound 142(1). In addition, a microwave from an adjacent room may emit a beeping sound 142(2), while a dishwasher (in this example) emits a buzzing sound 142(3) in yet another adjacent room, indicating that a cycle has finished. As introduced above, the microphone 108 of the device 106 may capture these sounds over time and generate corresponding audio signals. The device 106 may then analyze each respective signal to identify frequency and amplitude of the signals over time. In addition, the device 106 may utilize TDOA, beamforming, or other techniques to determine a direction from which the sound(s) in each audio signal originated. The device 106 may then utilize the frequency, the amplitude, and/or the direction associated with the sound to create an acoustic signature 120 associated with each audio signal and underlying sound.

For instance, upon generating an audio signal corresponding to the ringing sound 142(1) of the phone 140, the device may store this signature, potentially along with an indication that no voice command was received within a threshold amount of time after hearing the ring. Thereafter, when the device 106 generates another audio signal and determines a signature of this new audio signal, the new signature may be compared against the signature associated with the ringing sound 142(1). If the signatures are substantially similar (and, hence, "match"), then the device 106 may increment the number of times that the device has heard the ringing sound 142(1). Further, the device 106 may continue to signature-match in this manner, potentially until the ringing sound 142(1) has been heard a threshold number of times (without a voice command following within the threshold amount of time). At this point, the device 106 may store, in the datastore 122, an indication that the ringing sound 142(1) is an environmental sound that is to be removed from subsequent audio signals that include this sound.

Thereafter, when the microphone 108 generates an audio signal that includes a signature that is substantially similar to the stored signature associated with the ringing sound 142(1), the AEC module 118 may remove the portion of the audio signal corresponding to the ringing sound 142(1). As discussed above, this may include subtracting out the waveform associated with the ringing sound 142(1) from the audio signal, applying a notch filter to a particular frequency range, or the like. After removing this noise from the audio signal to generate a modified audio signal, the speech-recognition engine 116 (or 132) may perform ASR on the modified audio signal to identify any commands therein.

In addition to identifying sounds from the environment automatically and storing these environmental sounds in the datastore 122, in some instances the user 104 may aid in the identification of these sounds. For instance, the user may provide a voice command or other input (e.g., via a push of a button the device 106) to indicate that a particular sound is an environmental sound that is to be filtered. For instance, after the beeping sound 142(2) of the microwave, the user 104 may provide a voice command indicating that the high-pitched beeping sound is an environmental sound that is to be filtered.

Furthermore, each of the environmental sounds indicated in the datastore may be able to be played back to the user 104 to confirm that they should be removed from subsequent audio signals, or to allow the user to indicate that they should not be classified as such. For instance, the user 104 may issue a voice command or other type of command to the device 106 to play back some or all of the environmental sounds being filtered. The speaker 110 of the device 106 may then play black one or more of the environmental sounds 122 and the user 104 may indicate whether each sound should or should not be indicated as a sound to be removed. In other instances, the device 106 or the remote resources 124 may provide this information to a computing device of the user 104, such that the user 104 is able to play back the sounds on the computing device and indicate on the device whether the sounds are appropriately classified.

Furthermore, it is noted that FIG. 1 also illustrates that the modules and data stored on the device 106 may similarly or alternatively be stored on the remote resources 124. In some instances, the device 106 may perform the techniques described herein, while in other instances the remote resources 124 may perform these techniques after receiving audio signal(s) from the device 106. In still other instances, some or all of the techniques are performed at the device 106 while some or all techniques are additionally or alternatively performed at the remote resources 124.

Figure 2:
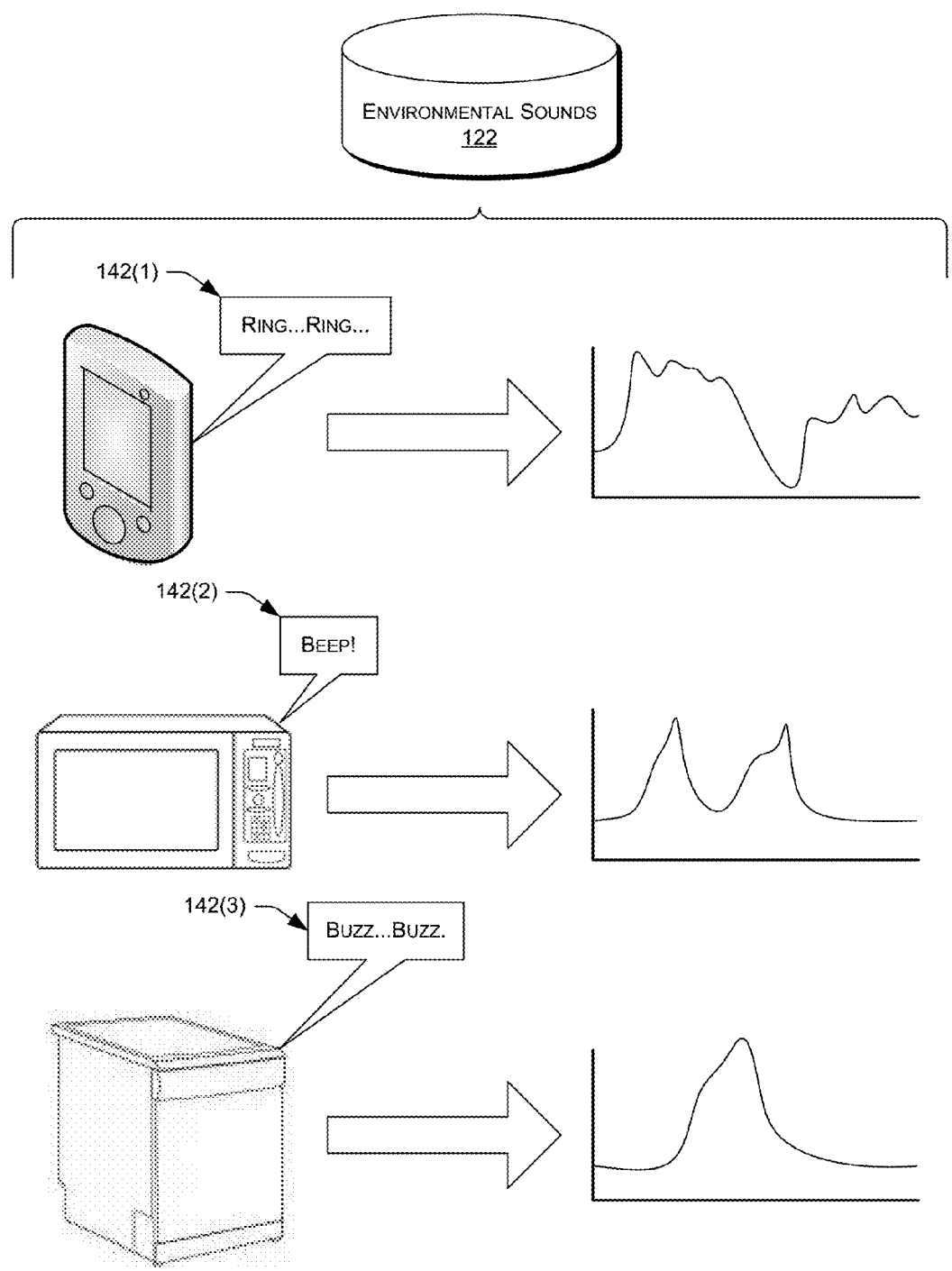
FIG. 2 illustrates example signatures of example environmental sounds that may be identified and removed from generated audio signals.

FIG. 2 illustrates example signatures of example environmental sounds that may be identified and removed from generated audio signals. In this example, the device 106 stores an indication in the datastore 122 that the environmental sounds that are to be filtered include the ringing sound 142(1) from the user's mobile phone 140, the beeping sound 142(2) of the microwave, and the buzzing sound 142(3) of the dishwasher. As illustrated, each signature may indicate amplitude and frequency of the corresponding sounds over time. The signature may further include a direction from which the sound is typically heard from, given that appliances and other sound-producing entities rarely move, although some signatures might not include this information.

When the microphone 108 generates a new audio signal based on sound emitted within the environment 102, the device 106 may signature-match the new audio signal with the illustrated signatures to determine whether or not to remove a portion of the new audio signal (because it corresponds to an environmental sound rather than a voice command). In some instances, two signatures may be deemed to match in response to these signatures being substantially similar (e.g., 90%, 95%, etc.). Similarly, a first sound and a second sound may be deemed substantially similar to one another when their corresponding signatures "match" in this manner.

In this example, each of the three illustrated signatures correspond to sounds heard within the environment 102 of the device 106. In other instances, however, the remote resources 124 may share information regarding environmental sounds heard in other environments that include other voice-controlled devices. For instance, the remote resources may receive signatures corresponding to environmental sounds from other environments and may share these signatures with still other devices, such as the device 106. Therefore, some indications stored in the datastore 122 may correspond to environmental sounds not yet heard within the environment, but that if heard, would nevertheless be removed. Candidates of environmental sounds that may be shared across multiple voice-controlled devices include the sound of a doorbell, street noise, common ringtones, and the like.

Figure 3A:
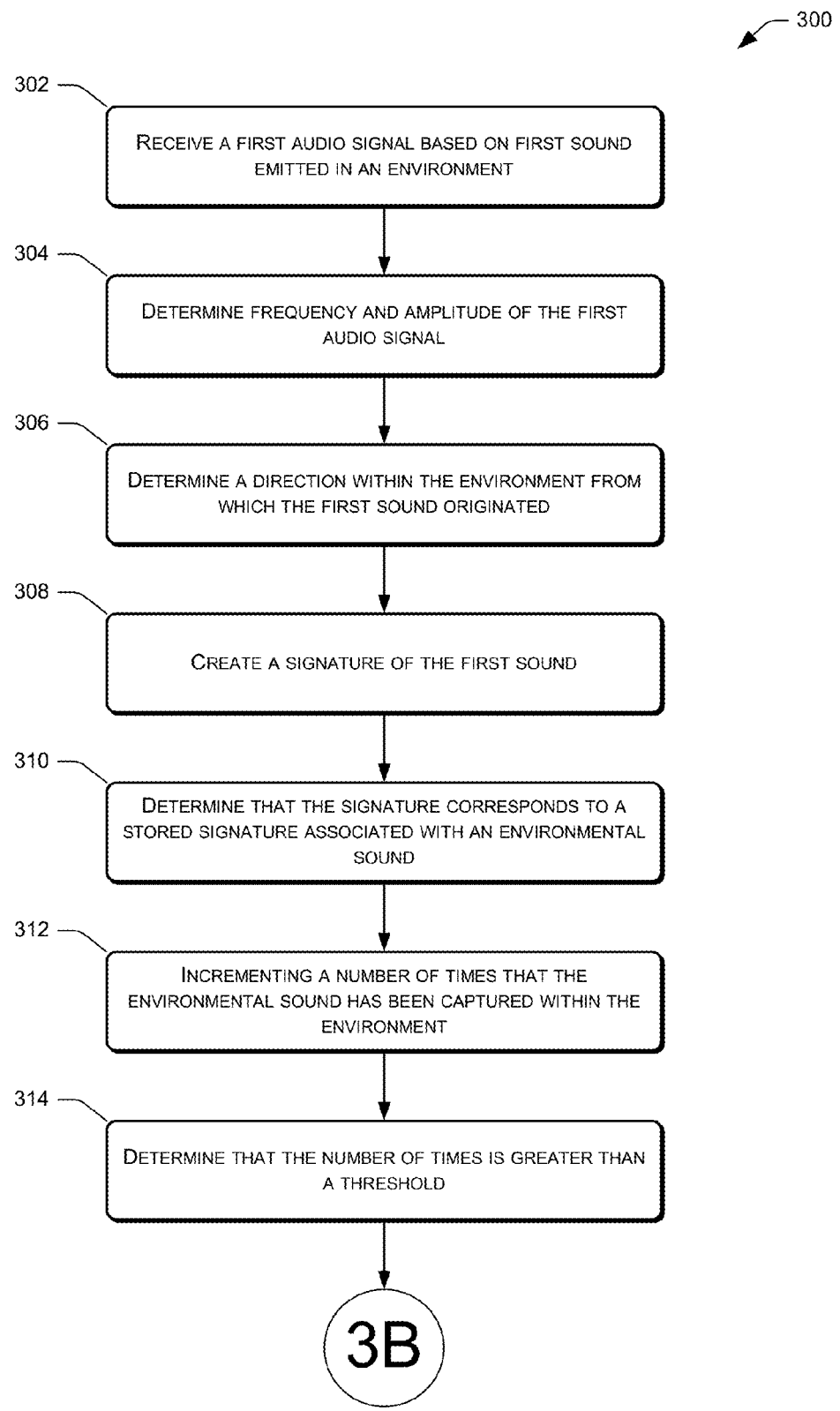
FIGS. 3A-B illustrate an example process for identifying an environmental sound and removing a portion of an audio signal corresponding to the environmental sound for the purpose of increasing a signal-to-noise ratio (SNR) of the resulting modified audio signal.
Figure 3B:
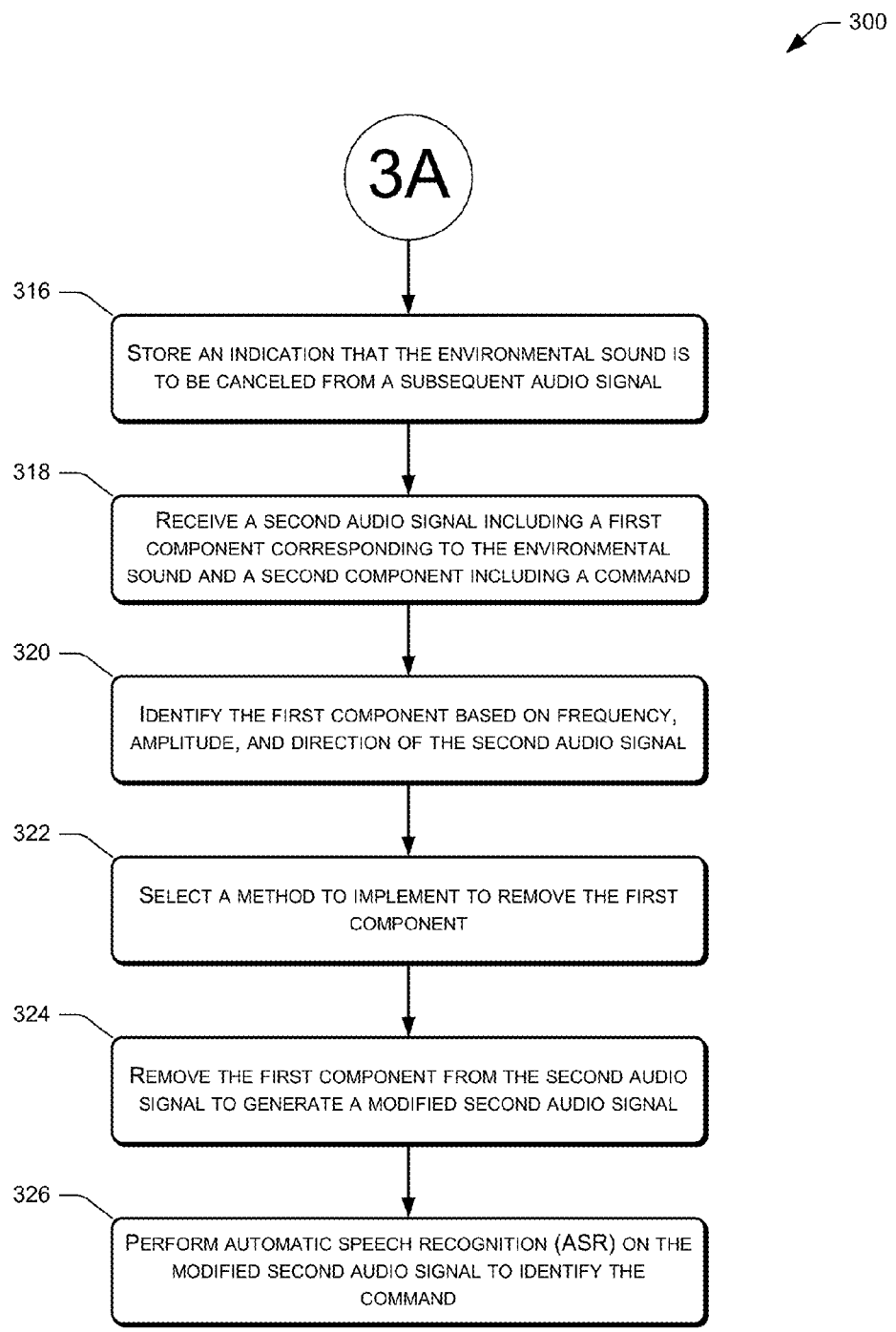

FIGS. 3A-B illustrate an example process 300 for identifying an environmental sound and removing a portion of an audio signal corresponding to this sound for the purpose of increasing a signal-to-noise ratio (SNR) of the resulting modified audio signal. The process 300 is described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. The order in which the operations are described is not intended to be construed as a limitation, and any number of the described operations can be combined in any order and/or in parallel to implement the process. Finally, the process 300 may be performed by the voice-controlled device 106, the remote resources 124, another entity, or a combination thereof.

The process 300 includes, at 302, receiving a first audio signal based on first sound emitted in an environment. For instance, the microphone 108 of the device may generate this first audio signal. In some instances, prior to receiving the first audio signal, the process 300 determines that a user has uttered a predefined keyword. For instance, the process 300 may "listen" for the user to utter the predefined keyword, signaling that the user may intend to issue a voice command. After identifying the predefined keyword, the first audio signal may then be received or generated.

At 304, the process 300 determines frequency and amplitude of the first audio signal over time. At 306, the process 300 may determine a direction within the environment from which the sound originated. In some instances, the device that generates the first audio signal may include multiple microphones. These multiple microphones may be used to determine the direction from which a sound originated, either via time-difference-of-arrival techniques, the utilization of beampatterns by these multiple microphones, or the like.

At 308, the process 300 creates a signature of the first sound associated with the first audio signal based on the frequency, amplitude, and direction associated with the sound. After signature-matching this signature against signatures associated with sounds previously emitted within the environment, the process determines, at 310, that the signature corresponds to a stored signatures associated within an environmental sound previously heard in the environment. As described above, the signature may correspond to or match another signature based on these two signatures being substantially similar to one another.

In some instances, the identification of the environmental sound at 310 may be aided by one or more other factors, such as a current time of day, a current date, a current day of the week, a user currently in the room, a command recently received at the device, or the like. For instance, if one of the environmental sounds that has been classified for removal comprises church bells that the device often hears at the top of every hour, then the current time associated with the first audio signal may be taken into account when determining whether the first audio signal represents a sound that is to be removed from the audio signal. In another example, if the ringing sound 142(1) of the mobile phone 140 is often heard when the user 104 is in the environment 102, then the presence of the user 104 (e.g., determined via voice recognition) within the environment may increase the chance that the device 106 or the remote resources 124 will identify the ringing sound 142(1) within the first audio signal. In some instances, the amount of similarity needed between two signatures needed to find a "match" may be dynamically adjusted to account for these factors. For instance, at 12:00 pm, a sound might need only be 85% similar to a signature associated with church bells often heard at that time in order to determine that the signatures match, while at 12:39 pm the signatures may need to be 95% similar in order to be deemed a match.

After determining that the generated signature matches the stored signature, the process 300, at 312, increments the number of times that the environmental sound has been captured or "heard" within the environment. That is, if the sound has previously been heard two times within the environment, then the process 300 increments this number to indicate that the sound has now been heard three times. At 314, the process 300 compares this number to a threshold and determines that the number of times that the environmental sound has been heard within the environment is in fact greater than the threshold and, hence, that the environmental sound is now to be removed from subsequent audio signals that indicate this sound.

FIG. 3B continues the illustration of the process 300. At 316, the process 300 stores an indication that the environmental sound is to be canceled from a subsequent audio signal. At 318, the process 300 receives a second audio signal that includes a first component, corresponding to the environmental sound, and a second component, corresponding to a voice command of a user within the environment. At 320, the process 300 identifies the first component based on the frequency, the amplitude, and/or the direction associated with the second audio signal. That is, the process 300 signature-matches a portion of the second audio signal to the previously stored signature associated with the environmental sound. At 322, the process 300 selects a method to implement to remove the first component from the second audio signal. As described above, the method may be selected based on one or more characteristics associated with the second audio signal and/or the environmental sound.

After selecting the appropriate method (e.g., parametric filter, subtraction, etc.), the process 300 removes, at 324, the first component from the second audio signal to generate a modified second audio signal having an increased SNR as compared to the original second audio signal. Finally, at 326, the process 300 performs ASR on the modified second audio signal to identify the voice command of the user. An operation corresponding to the voice command may be now be performed.

Figure 4:
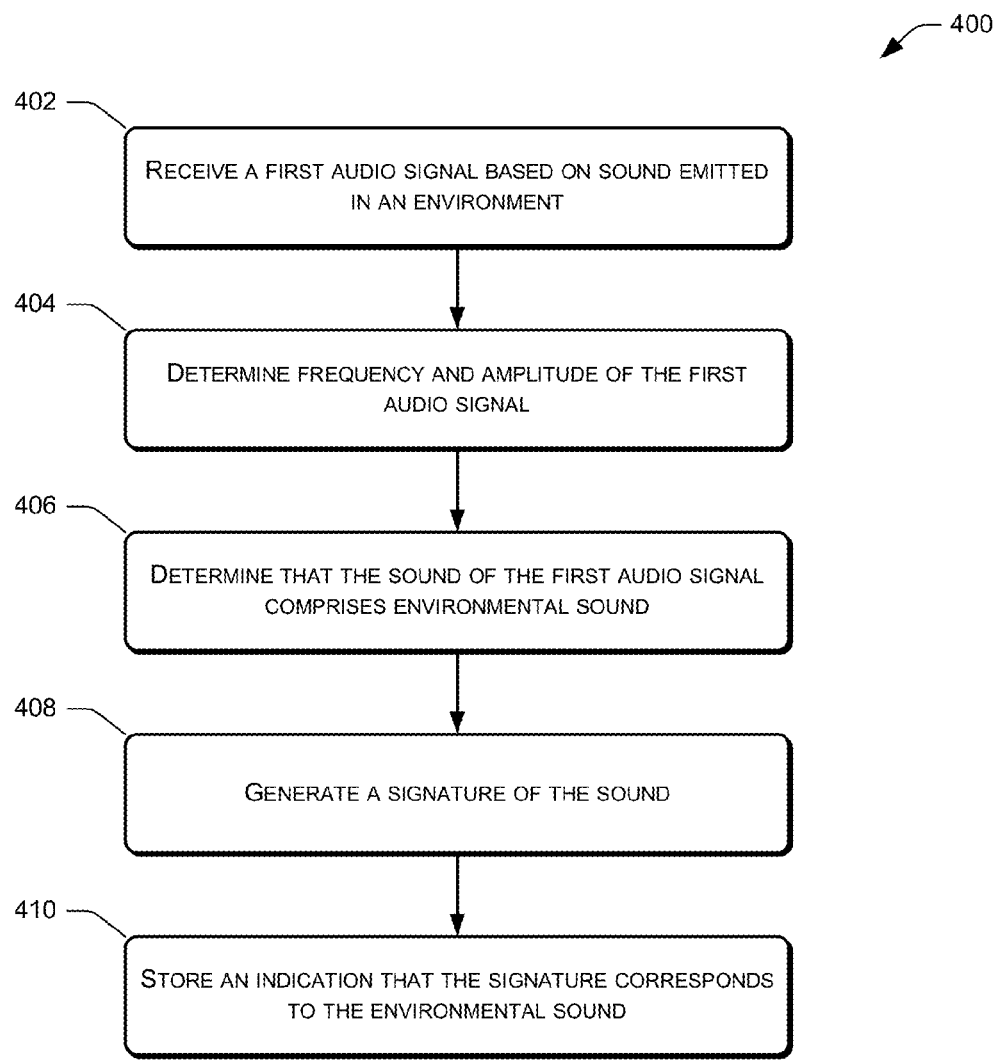
FIG. 4 illustrates an example process for identifying an environmental sound in an audio signal.

FIG. 4 illustrates another example process 400 for identifying an environmental sound in an audio signal. At 402, the process receives a first audio signal based on sound emitted within an environment. In some instances, the first audio signal may be generated and/or received after determining that a user has uttered a predefined keyword in the environment. In some instances, the process 400 may determine that no voice command is included in the first audio signal.

At 404, the process determines frequency and amplitude of the first audio signal. Then, at 406, the process 400 may determine, based on at least one of the frequency, the amplitude, or that no voice command has been detected in the first audio signal, that the sound comprises an environmental sound that is to be removed from subsequent audio signals that include the sound. In some instances, the process 400 may determine at least one of a time of day, a date, or a day of the week at which the sound was emitted in the environment, and determining that the sound is the environmental sound may be further based on this information. For instance, if church bells often ring at 9:00 am on a Sunday, then an audio signal captured around 9:00 am on a Sunday may be more likely to be determined an environmental sound. In another example, the process 400 may identify a user within the environment (e.g., via voice-recognition techniques) and may use this information in determining whether or not the sound is an environmental sound. For instance, if a cell phone ring is often heard when a user is within the environment, then a sound may be more likely to be deemed an environmental sound when that user is within the environment.

At 408, the process 400 generates a signature of the sound that has been deemed to be the environmental sound. At 410, the process 400 stores an indication that the signature corresponds to the environmental sound that is to be removed from subsequent audio signals representative of sound subsequently emitted in the environment.

Figure 5:
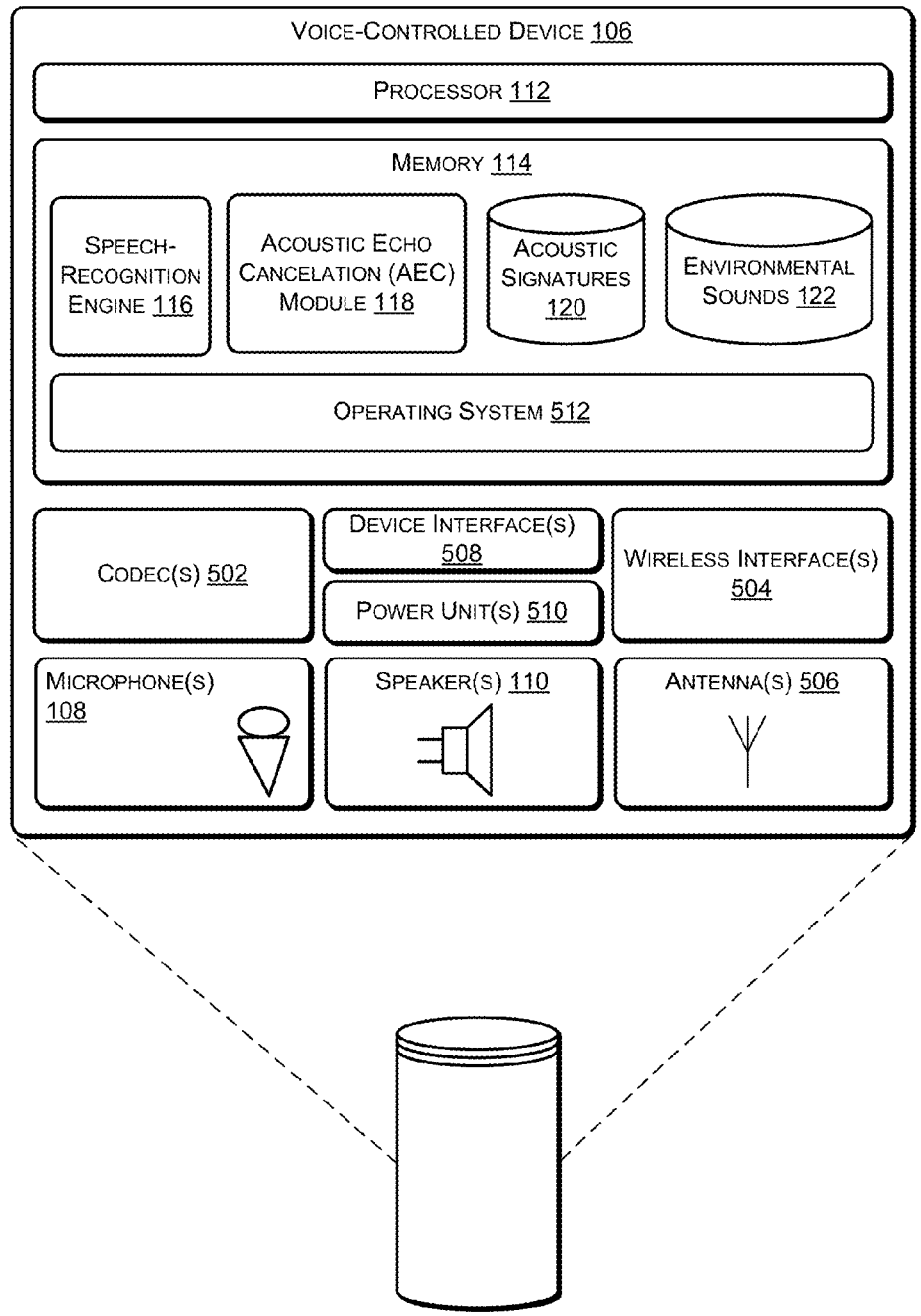
FIG. 5 shows a block diagram of selected functional components implemented in the voice-controlled device of FIG. 1.

FIG. 5 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 112 and memory 114. As used herein, a processor may include multiple processors and/or a processor having multiple cores. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 includes a microphone unit that comprises one or more microphones 108 to receive audio input, such as user voice input. The device 106 also includes a speaker unit that includes one or more speakers 110 to output audio sounds.

One or more codecs 502 are coupled to the microphone(s) 108 and the speaker(s) 110 to encode and/or decode the audio signals. The codec may convert audio data between analog and digital formats. A user may interact with the device 106 by speaking to it, and the microphone(s) 108 captures sound and generates an audio signal that includes the user speech. The codec(s) 502 encodes the user speech and transfers that audio data to other components. The device 106 can communicate back to the user by emitting audible statements through the speaker(s) 110. In this manner, the user interacts with the voice-controlled device simply through speech, without use of a keyboard or display common to other types of devices.

In the illustrated example, the voice-controlled device 106 includes one or more wireless interfaces 504 coupled to one or more antennas 506 to facilitate a wireless connection to a network. The wireless interface(s) 504 may implement one or more of various wireless technologies, such as wifi, Bluetooth, RF, and so on.

One or more device interfaces 508 (e.g., USB, broadband connection, etc.) may further be provided as part of the device 106 to facilitate a wired connection to a network, or a plug-in network device that communicates with other wireless networks. One or more power units 510 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple lighting elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 114 and configured to execute on the processor 112. An operating system module 512 is configured to manage hardware and services (e.g., wireless unit, Codec, etc.) within and coupled to the device 106 for the benefit of other modules. In addition, the memory 114 may include the speech-recognition engine 116, the AEC module 118, the acoustic signatures 120, and the indications 122 of the environmental sounds, discussed above.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An electronic device comprising:
   one or more microphones;
   one or more processors; and
   one or more computer-readable media storing computer-executable instructions that, when executed, cause the one or more processors to perform acts comprising:
   receiving a first audio signal generated by the one or more microphones based on first sound in an environment;
   determining frequency and amplitude of the first audio signal;
   determining a direction within the environment from which the first sound originated;
   creating a signature of the first sound based at least in part on the frequency, the amplitude, and the direction;
   determining that the signature corresponds to a stored signature associated with an environmental sound;
   incrementing a number of times that the environmental sound has been captured within the environment;
   determining that the number of times is greater than a threshold;
   storing an indication that the environmental sound is to be canceled from a subsequent audio signal that is generated by the microphone and that indicates the environmental sound;
   receiving a second audio signal generated by the one or more microphones based on second sound in the environment, the second audio signal including a first component corresponding to the environmental sound and a second component corresponding to a voice command uttered by a user;
   identifying the first component based at least in part on frequency, amplitude, and direction of at least a portion of the second audio signal;
   removing, from the second audio signal, the first component to generate a modified second audio signal; and
   performing automatic speech recognition (ASR) on the modified second audio signal to identify the voice command uttered by the user.

2. An electronic device as recited in claim 1, the acts further comprising:
   performing ASR on the first audio signal; and
   determining that the first audio signal does not include a voice command from the user.

3. An electronic device as recited in claim 1, the acts further comprising selecting, based at least in part on at least one of frequency or amplitude of the second audio signal, one of multiple methods to implement to remove the first component, wherein the multiple methods include:
   utilizing a filter to remove at least one specified frequency range from the second audio signal and;
   subtracting the first component of the second audio signal from the second audio signal.

4. An electronic device as recited in claim 1, the acts further comprising determining that the user uttered a keyword, and wherein the receiving of the first audio signal occurs at least partly in response to determining that the user uttered the keyword.

5. A method comprising:
   receiving, by a computing device, a first audio signal representative of a first sound in an environment;
   determining frequency and amplitude of the first audio signal;
   determining a first signature of the first sound based at least in part on the frequency and the amplitude;
   determining, using the first signature, a number of times that a second sound has previously been received, the second sound comprising a second signature that matches the first signature;
   determining that the number of times is greater than a threshold;
   generating an indication that the first signature corresponds to an environmental sound;
   storing the indication in a datastore;
   removing, by a filter of the computing device, the first audio signal corresponding to the environmental sound from subsequent audio signals; and
   sending the subsequent audio signals for processing.

6. A method as recited in claim 5, wherein the determining the number of times comprises determining the number of times that the second sound has been received without a voice command being detected within a predefined amount of time.

7. A method as recited in claim 5, further comprising determining a direction within the environment from which the first sound originated, and wherein the first signature is further based at least in part on the direction.

8. A method as recited in claim 5, further comprising:
   receiving a second audio signal having a first component corresponding to the environmental sound and a second component corresponding to a voice command uttered by a user; and
   determining that the first component corresponds to the environmental sound based at least in part on at least one of frequency or amplitude of the second audio signal,
   wherein removing the first audio signal corresponding to the environmental sound from subsequent audio signals comprises removing the first component from the second audio signal.

9. A method as recited in claim 5, wherein the filter corresponds to at least one frequency range associated with the environmental sound.

10. A method as recited in claim 8, wherein the removing the first component comprises subtracting an amplitude of the first component from an amplitude of the second audio signal.

11. A method as recited in claim 8, further comprising selecting one of multiple methods to implement to remove the first component from the second audio signal, the selecting based at least in part on at least one of the frequency or the amplitude of the second audio signal.

12. A method as recited in claim 5, further comprising determining that a user in the environment uttered a keyword, and wherein the receiving of the first audio signal occurs at least partly in response to determining that the user uttered the keyword.

13. One or more computing devices comprising:
one or more processors; and
one or more computer-readable media storing computer-executable instructions that, when executed, cause the one or more processors to perform acts comprising:
receiving a first audio signal representative of a first sound in an environment;
determining frequency and amplitude of the first audio signal;
determining a first signature of the first sound based at least in part on the frequency and the amplitude;
determining, using the first signature, a number of times that a second sound has previously been received, the second sound comprising a second signature that matches the first signature;
determining that the number of times is greater than a threshold;
storing an indication that the first signature corresponds to an environmental sound;
removing the environmental sound from a subsequent audio signal; and
causing automatic speech recognition to be performed on the subsequent audio signal.

14. One or more computing devices as recited in claim 13, wherein the determining the number of times comprises determining the number of times that the second sound has been received without a voice command being detected within a predefined amount of time.

15. One or more computing devices as recited in claim 13, further comprising determining a direction within the environment from which the first sound originated, and wherein the first signature is further based at least in part on the direction.

16. One or more computing devices as recited in claim 13, the acts further comprising:
receiving a second audio signal having a first component corresponding to the environmental sound and a second component corresponding to a voice command uttered by a user;
determining that the first component corresponds to the environment sound based at least in part on at least one of frequency or amplitude of the second audio signal; and
removing the first component from the second audio signal.

17. One or more computing devices as recited in claim 16, wherein the removing comprises removing the first component using a filter corresponding to at least one frequency range of the first component.

18. One or more computing devices as recited in claim 16, wherein the removing comprises subtracting an amplitude of the first component from an amplitude of the second audio signal.

19. One or more computing devices as recited in claim 16, further comprising selecting one of multiple methods to implement to remove the first component from the second audio signal, the selecting based at least in part on at least one of the frequency or the amplitude of the second audio signal.

20. One or more computing devices as recited in claim 13, the acts further comprising determining that a user in the environment uttered a keyword, and wherein the receiving of the first audio signal occurs at least partly in response to determining that the user uttered the keyword.

* * * * *